United States Patent
Nakano et al.

(10) Patent No.: US 10,647,208 B2
(45) Date of Patent: May 12, 2020

(54) CHARGING CONTROL UNIT AND CHARGING CONTROL METHOD

(71) Applicant: Nissan Motor Co., Ltd., Yokohama-shi, Kanagawa (JP)

(72) Inventors: Noboru Nakano, Kanagawa (JP); Yoshio Shimoida, Kanagawa (JP); Takashi Yoshida, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/577,953

(22) PCT Filed: May 29, 2015

(86) PCT No.: PCT/JP2015/065668
§ 371 (c)(1),
(2) Date: Nov. 29, 2017

(87) PCT Pub. No.: WO2016/194081
PCT Pub. Date: Dec. 8, 2016

(65) Prior Publication Data
US 2018/0147950 A1 May 31, 2018

(51) Int. Cl.
*B60L 11/18* (2006.01)
*H02J 7/00* (2006.01)
(Continued)

(52) U.S. Cl.
CPC ........... *B60L 11/1838* (2013.01); *B60L 53/14* (2019.02); *B60L 53/60* (2019.02); *B60L 53/63* (2019.02);
(Continued)

(58) Field of Classification Search
CPC .. B60L 11/1838; B60L 11/1816; H02J 7/0027
(Continued)

(56) References Cited

U.S. PATENT DOCUMENTS

2010/0228405 A1* 9/2010 Morgal .................... B62H 3/02
701/2
2011/0106329 A1* 5/2011 Donnelly .................. B60L 3/12
700/291
(Continued)

FOREIGN PATENT DOCUMENTS

JP 2011244630 A 12/2011
JP 2013055731 A 3/2013

*Primary Examiner* — Edward Tso
*Assistant Examiner* — Dung V Bui
(74) *Attorney, Agent, or Firm* — Young Basile Hanlon & MacFarlane, P.C.

(57) ABSTRACT

A charging control unit determines whether the electric vehicles are coupled to the respective charging ports and calculates the estimate value Tc and the estimate value Tr for every charging port coupled. The estimate value Tc is the period from start of charging to completion of charging. The estimate value Tr is the period from completion of charging to departure. The charging control unit, when the electric vehicle coupled t last is set to the N-th vehicle and the electric vehicles already coupled are set to the first to N−1-th vehicles in the order of being coupled, and only when Formula (4) is satisfied by all the first to N−1-th vehicles, starts charging of the N-th vehicle. The charging control unit controls to resume charging of the vehicle that was charging immediately before the N-th vehicle started charging as soon as charging of the N-th vehicle finishes.

4 Claims, 6 Drawing Sheets

(51) Int. Cl.
*B60L 58/12* (2019.01)
*B60L 53/14* (2019.01)
*B60L 53/63* (2019.01)
*B60L 53/66* (2019.01)
*B60L 53/60* (2019.01)
*B60L 53/67* (2019.01)

(52) U.S. Cl.
CPC ............... *B60L 53/66* (2019.02); *B60L 53/67* (2019.02); *B60L 58/12* (2019.02); *H02J 7/00* (2013.01); *H02J 7/0027* (2013.01); *H02J 7/00036* (2020.01); *H02J 7/0071* (2020.01); *B60L 2240/80* (2013.01); *B60L 2250/14* (2013.01); *B60L 2260/58* (2013.01); *Y02T 10/7005* (2013.01)

(58) Field of Classification Search
USPC .......................................................... 320/109
See application file for complete search history.

(56) References Cited

U.S. PATENT DOCUMENTS

| | | | |
|---|---|---|---|
| 2011/0175569 A1* | 7/2011 | Austin .................. | H01M 10/44 320/109 |
| 2013/0099741 A1* | 4/2013 | Shimizu ................ | H02J 7/0036 320/109 |
| 2014/0089016 A1* | 3/2014 | Smullin ................ | G06Q 10/02 705/5 |
| 2015/0202975 A1* | 7/2015 | Solomon .......... | G06Q 10/06316 705/7.26 |

* cited by examiner

CHARGING CONTROL UNIT AND CHARGING CONTROL METHOD

TECHNICAL FIELD

The present invention relates to a charging control unit and a charging control method.

BACKGROUND

Conventionally, there has been known a technique that sets a constant unit quantity of, for example, a charging time and a charging capacity, and performs charging in order by the unit quantity, when a total quantity of charging capacities of a plurality of charging target vehicles exceeds a chargeable capacity, so as to eliminate uncharged electric vehicles (see JP2011-244630A).

However, the technique in JP2011-244630A sets the order of the vehicles to charge according to the first-come basis, and necessary periods for charging and planned departure times of the respective vehicles are not considered. Therefore, this technique has a problem that there possibly occurs a situation in which even a vehicle whose necessary period for charging is short and planned departure time is approaching has to wait for charging of vehicles that have sufficient time to spare until the planned departure times.

SUMMARY

An object of the present invention is to provide a technique that further appropriately controls a charging order of respective vehicles by considering necessary periods for charging and planned departure times of the respective vehicles.

A charging control unit according to one embodiment includes the plurality of charging ports and sequentially charges the electric vehicles coupled to the respective charging ports. The charging control unit determines whether the electric vehicles are coupled to the respective charging ports or not. The charging control unit calculates the estimate value Tc and the estimate value Tr for every charging port that is determined to have the coupling of the electric vehicle. The estimate value Tc is the period that takes from the start of charging to the completion of charging of the electric vehicle coupled to the charging port. The estimate value Tr is the period from the completion of charging of the electric vehicle to the departure of the electric vehicle. The charging control unit, when the electric vehicle coupled to the charging ports last is set to the N-th vehicle and the electric vehicles already coupled to the charging ports are set to the first to N−1-th vehicles in the order of being coupled to the charging ports, and only when the following Formula (3) is satisfied by all the first to N−1-th vehicles, starts charging of the N-th vehicle. The charging control unit controls to resume charging of the vehicle that was charging immediately before the N-th vehicle started charging as soon as charging of the N-th vehicle finishes.

Embodiments of the present invention will be described below in details along with attached drawings.

DESCRIPTION OF EMBODIMENTS

First Embodiment

Figure 1:
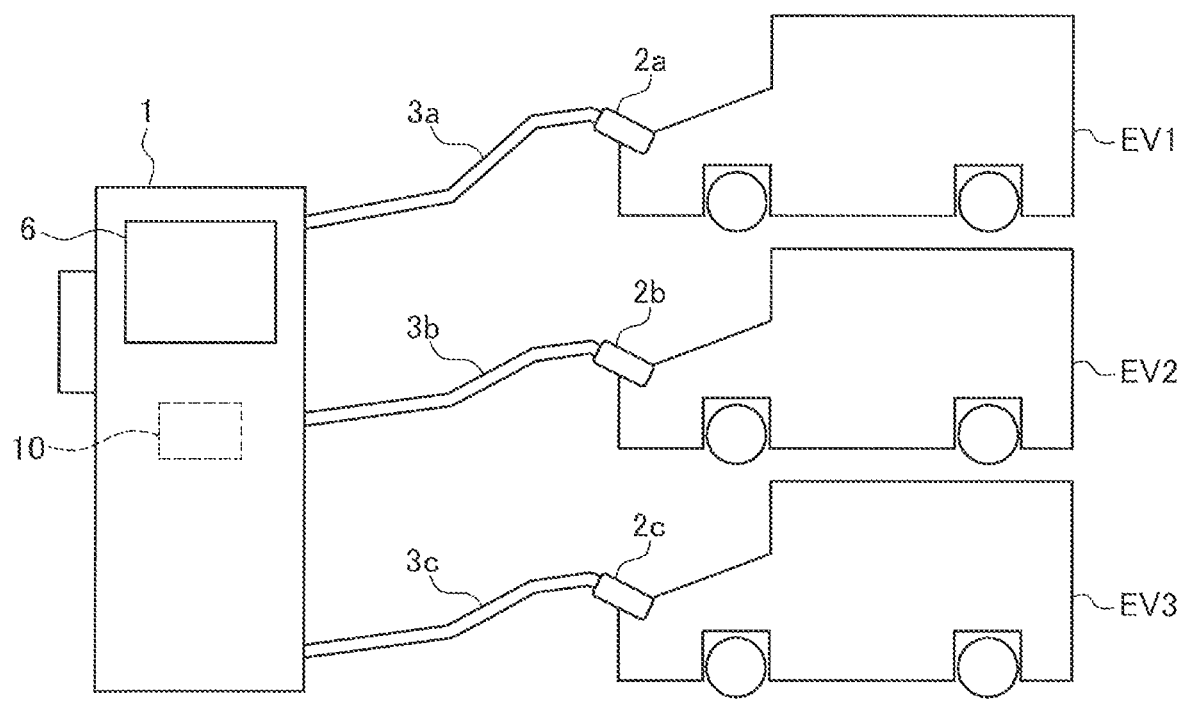
FIG. 1 is a configuration diagram illustrating a relationship between a charger including a charging control unit according to the present invention and electric vehicles that require charging.

FIG. 1 is a configuration diagram illustrating a relationship between a charger including a charging control unit according to the first embodiment and electric vehicles that require charging.

As illustrated in FIG. 1, a charger 1 of this embodiment includes, besides an input panel 6 and a charging control unit 10, electric power cables 3a, 3b, and 3c that extend from the charger 1 and charging ports 2a, 2b, and 2c disposed at distal ends of the respective electric power cables. The charging ports 2a, 2b, and 2c are coupled on one to one basis to respective electric vehicles EV1 to EV3 that desire charging. Then, the charger 1 charges the electric vehicle in a state where at least any one set of these respective charging ports 2a to 2c and the electric vehicles EV1 to EV3 is coupled.

The input panel 6 is disposed in an upper portion of the charger 1. The input panel 6 is an input device that receives predetermined input operations regarding the charging. The input panel 6 is configured that a passenger or the like of the vehicle that desires charging can input a planned departure time and a target battery charging capacity (hereinafter simply referred to as a target SOC too) of the vehicle. It should be noted that the target SOC input to the input panel 6 may be a specified price, such as a thousand yen worth, other than a percentage, such as 80%.

The charging control unit 10 according to the present invention, when a plurality of the electric vehicles is coupled to the charger 1, executes a control to charge these electric vehicles (hereinafter simply referred to as vehicles too) in an appropriate order.

More specifically speaking, the charging control unit 10 determines availability of interrupt charging for a later-arrived vehicle with respect to an earlier-arrived vehicle in charging, and controls the charging order of each of the vehicles on the basis of the determination result. The following describes the details.

Figure 2:
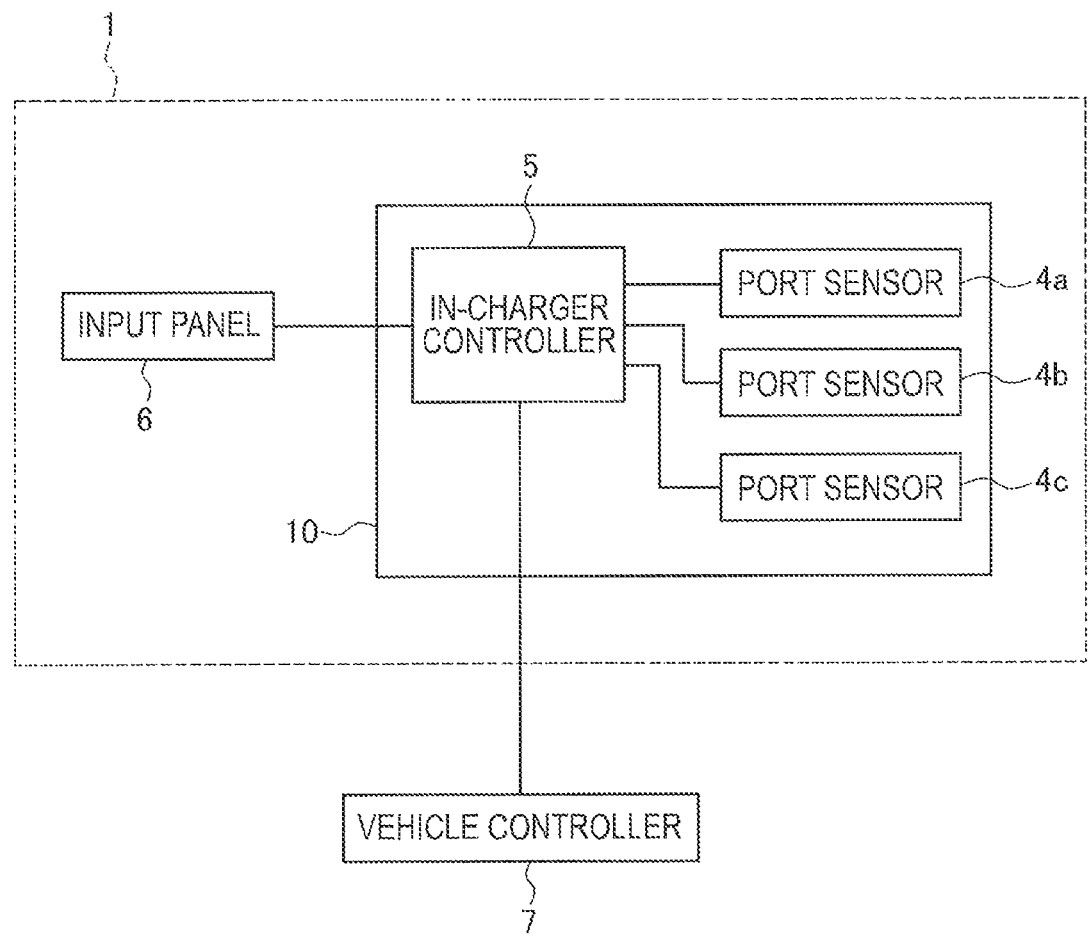
FIG. 2 is a block diagram illustrating a main configuration of the charger including a charging control unit according to a first embodiment.

FIG. 2 is a block diagram illustrating a main configuration of the charger 1 including the charging control unit 10 according to the first embodiment. The charging control unit 10 of this embodiment is included in the charger 1 and constituted of three port sensors 4a, 4b, and 4c and an in-charger controller 5 (hereinafter simply referred to as the controller 5). The controller 5 is communicatively coupled to the input panel 6 included in the charger 1. When the electric vehicle and the charger 1 are coupled, the controller 5 comes into a state where a communication with a vehicle controller 7 included in the electric vehicle is possible via the electric power cable (not illustrated in FIG. 2) used for this coupling.

The port sensors 4a to 4c are disposed in the respective charging ports 2a to 2c illustrated in FIG. 1. The port sensors 4a to 4c detect whether the respective charging ports and the electric vehicles are coupled or not, that is, whether the electric vehicles are coupled to the charger 1 or not. Detected information regarding coupled/not coupled is output to the controller 5.

The vehicle controller 7 is included in the electric vehicle. The vehicle controller 7 monitors internal information, such as an electric energy, what is called, a charging percentage (SOC: State of Charge) of a battery included in the electric vehicle and a battery temperature, and controls charging and discharging operations of the battery. The information, such as the SOC, of the electric vehicle is output to the controller 5 via the electric power cable.

The controller 5 is a microcomputer constituted of, for example, a CPU, a ROM, and a RAM. The controller 5 determines the availability of interrupt charging for the vehicle coupled to the charger 1 from and after the second vehicle on the basis of the coupled/not coupled information between the charging ports 2a to 2c and the respective vehicles, the SOC information of the vehicle at a start of charging, and the planned departure time and the target SOC of the vehicle, which are obtainable from the above-described configuration. The controller 5 controls charging of each of the vehicles on the basis of this determination result.

On the basis of the above-mentioned configuration, a description will be given of the details of the charging control executed by the controller 5 with reference to FIG. 3.

Figure 3:
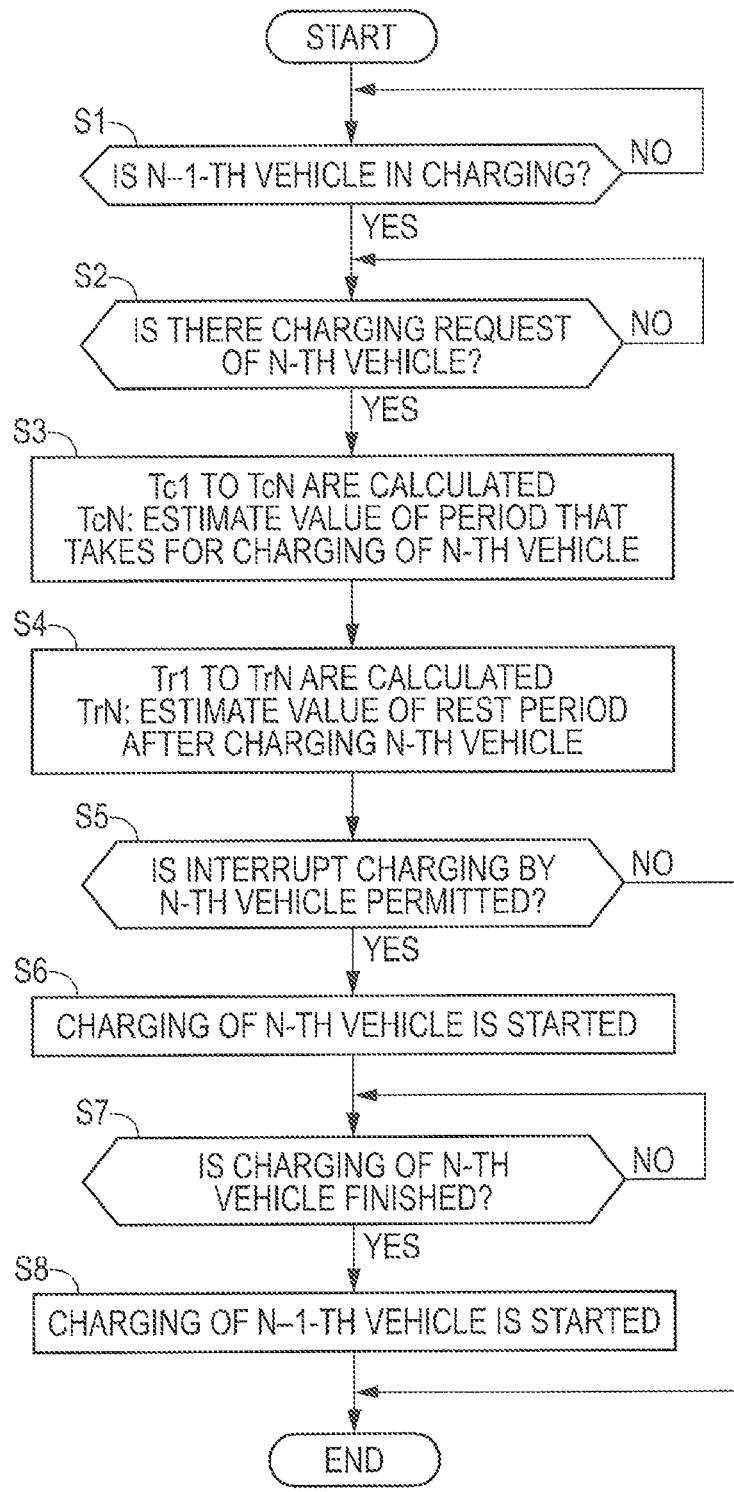
FIG. 3 is a flowchart showing a procedure of a charging control executed by the charging control unit according to the first embodiment.

FIG. 3 is a flowchart showing a procedure of the charging control executed by the controller 5 of the charging control unit 10 in this embodiment.

The charging control according to this embodiment is, as described above, to determine the availability of interrupt charging for the vehicle coupled to the charger 1 from and after the second vehicle and control charging of the plurality of vehicles coupled to the charger 1 on the basis of the determination result. Accordingly, this charging control is executed under assumption that at least one or more vehicle is in a state of being coupled to the charger 1, and one of the at least one or more vehicle is in charging, and furthermore, another vehicle that desires charging is newly coupled to the charger 1. In the following description, the newly coupled vehicle is referred to as an N-th vehicle (N is an integer of two or more). Vehicles that are already coupled to the charger 1 are referred to as first to N−1-th vehicles in an order of being coupled to the charger 1.

At Step S1, the controller 5 determines whether the N−1-th vehicle is in charging or not. When the N−1-th vehicle is in charging, the procedure proceeds to Step S2. When the N−1-th vehicle is not in charging, this step loops until the N−1-th vehicle starts charging.

At Step S2, the controller 5 determines whether the N-th vehicle requests charging or not. It is determined that there is a charging request when the controller 5 detects a coupling of any one of the charging ports 2a to 2c to the N-th vehicle from information output from the corresponding port sensor. When it is determined that there is the charging request, the procedure proceeds to Step S3. When it is determined that there is no charging request, Step S2 loops until it is determined that there is a charging request. However, the controller 5 may determine that there is the charging request when the charging port is coupled to the vehicle and the charging request from the passenger or the like is input to the controller 5 via the input panel 6 or the like.

Thus, the controller 5 has a function as a vehicle coupling determining unit that determines whether the electric vehicle is coupled to each of the charging ports or not.

At Step S3, the controller 5 calculates estimate values Tc (Tc1 to TcN) of periods that take for charging of the respective first to N-th vehicles. specifically, the estimate value Tc is calculated by the following Formula (1) on the basis of a battery remaining capacity SOCn [%] at the start of charging, a target battery charging capacity SOCt [%], a capacity [Ah] when the charging target battery is fully charged, and a charging current [A] supplied by the charger 1 to the charging target vehicle.

[Mathematical Formula 1]

$$Tc=(SOCt-SOCn) \times \text{capacity } [Ah] \text{ when fully charged}/ \text{charging current } A \quad (1)$$

The target battery charging capacity SOCt [%] can be obtained by the passenger inputting a desired target SOC into the input panel 6. The controller 5 can obtain the battery remaining capacity SOCn [%] at the start of charging from the vehicle controller 7 or calculate with an operation on the basis of a battery voltage of the vehicle obtained via the charging port. The capacity [Ah] when fully charged is calculated by multiplying a battery deterioration coefficient to a rated capacity [Ah] of the battery. The battery deterioration coefficient is a coefficient that varies corresponding to a state of the battery that each of the vehicles includes. The battery deterioration coefficient is stored in a storage medium included in the vehicle controller 7. The controller 5 can obtain this battery deterioration coefficient from the vehicle controller 7 included in each of the vehicles. Multiplying the rated capacity of the battery to the battery deterioration coefficient can estimate an accurate fully charged capacity [Ah] of the battery. In view of this, a further highly accurate estimate value Tc can be obtained. Furthermore, by considering temperature state information and the like of the battery obtainable from the vehicle controller 7 can calculate an even more highly accurate estimate value Tc. It should be noted that, as described above, in this working example, while the target battery charging capacity SOCt is the target SOC input by the passenger of the vehicle that desires charging by operating the input panel 6, it may be a preliminarily determined SOC, such as 100%. That is, the target battery charging capacity SOCt is a preliminarily determined battery SOC at a completion of charging and can be any value.

At subsequent Step S4, the controller 5 calculates estimate values Tr of periods (hereinafter also referred to as rest periods) from the completions of charging of the respective first to N-th vehicles to the departures of the vehicles. Specifically, as indicated in the following Formula (2), the estimate value Tr is calculated by subtracting the period Tc that takes for charging calculated at Step S3 from a period [hours] from a charging start time of the vehicle to the planned departure time of the vehicle.

[Mathematical Formula 2]

$$Tr=(\text{planned departure time}-\text{charging start time})- \text{estimate value } Tc \text{ of period that takes for charging} \quad (2)$$

The charging start time of the vehicle in Formula (2) is set to be an actual charging start time for the first to N−1-th vehicles and set to be the current time for the N-th vehicle. The controller 5 in this embodiment obtains the planned departure time of the vehicle from vehicle planned departure time information that is input by the passenger via the input panel 6. After the rest periods Tr1 to TrN of the respective vehicles are calculated, the procedure proceeds to Step S5.

Thus, the controller 5 has functions as a vehicle information detecting unit that detects vehicle information, such as the target battery charging capacity SOCt [%] and the battery capacity SOCn [%] at the start of charging, and a planned departure time detecting unit that detects the planned departure time of the vehicle. The controller 5 also has a function as a calculator that calculates, on the basis of these pieces of information, the estimate value Tc of the period that takes for charging of the electric vehicle and the estimate value Tr of the period from the completion of charging of the electric vehicle to the departure of this electric vehicle.

At Step S5, the controller 5 determines whether interrupt charging by the N-th vehicle is permitted or not. The controller 5 permits interrupt charging by the N-th vehicle in the case where the following Formula (3) is satisfied by all the first to N–1-th vehicles that are already coupled to the charger 1 when the N-th vehicle is coupled to the charger 1. In other words, in the case where the respective rest periods Tr of the first to N–1-th vehicles are more than the periods that take for charging of all the vehicles later arrived with respect to these vehicles (sum of the estimate periods Tc), interrupt charging by the N-th vehicle is permitted.

[Mathematical Formula 3]

$$Tr1 > Tc2 \pm Tc3 + \ldots + TcN$$

$$Tr2 > Tc3 + \ldots + TcN$$

$$TrN-1 > TcN \quad (3)$$

Tc: estimate value of period that takes for charging of electric vehicle

Tr: estimate value of period from completion of charging of electric vehicle to departure of this electric vehicle It should be noted that the above-described Formula (3) can be replaced like the following Formula (4).

[Mathematical Formula 4]

However, $1 \leq n \leq N-1$ $$Tr(n) > \Sigma_{n+1}^{N} Tc \quad (4)$$

In the case where the above-described Formula (3) or Formula (4) is satisfied by all the first to N–1-th vehicles and interrupt charging by the N-th vehicle is permitted, the procedure proceeds to Step S6. In the case where there is a vehicle that does not satisfy Formula (3) or Formula (4) and interruption by the N-th vehicle is determined not to be permitted, this control is finished in a state where the vehicle currently in charging continues to charge.

At Step S6, the charger 1 starts charging of the N-th vehicle that is permitted to interrupt.

At Step S7, the controller 5 determines whether charging of the N-th vehicle, which is permitted interrupt charging, is finished or not. When charging of the N-th vehicle is determined to be finished, the procedure proceeds to Step S8. As long as charging of the N-th vehicle is not confirmed to be finished, Step S7 loops until charging of the N-th vehicle is finished.

Then, at Step S8, the controller 5 resumes charging of the vehicle that was charging immediately before the N-th vehicle started interrupt charging, that is, the N–1-th vehicle. After resuming charging of the N–1-th vehicle, this control is finished.

Thus, the controller 5 determines the availability of interrupt charging for the N-th vehicle and has a function as a control unit that controls charging of each of the vehicles coupled to the charger 1 on the basis of the determination result.

It should be noted that, while it is not described in the flowchart according to FIG. 3, in the case where a charging request of a new vehicle is detected during interrupt charging by the N-th vehicle, this new vehicle is set as the N-th vehicle and the N-th vehicle in interrupt charging is set as the N–1-th vehicle. Then, the process in and after Step S1 are executed similarly to the description above.

The details of the charging control in this embodiment has been described above. Here, in a situation where the three electric vehicles (first to third vehicles) are sequentially coupled to the charger 1 that includes the three charging ports, differences between a charging aspect of when the charging control according to this embodiment is executed and a charging aspect of when the charging control according to this embodiment is not executed are described using FIG. 4 and FIG. 5.

Figure 4A:
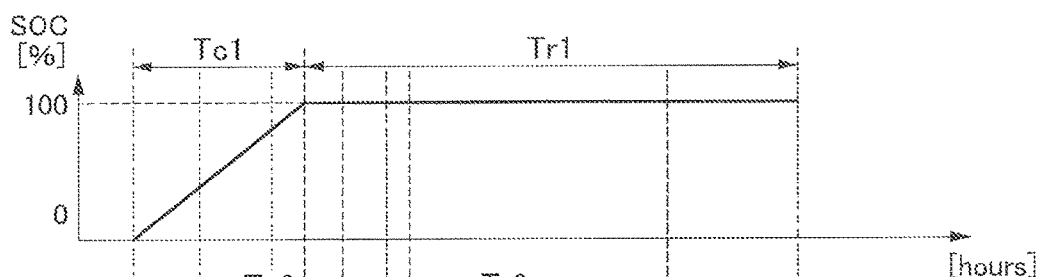
FIG. 4 are drawings to describe charging control aspects when the charging control according to the first embodiment is executed.
Figure 4B:
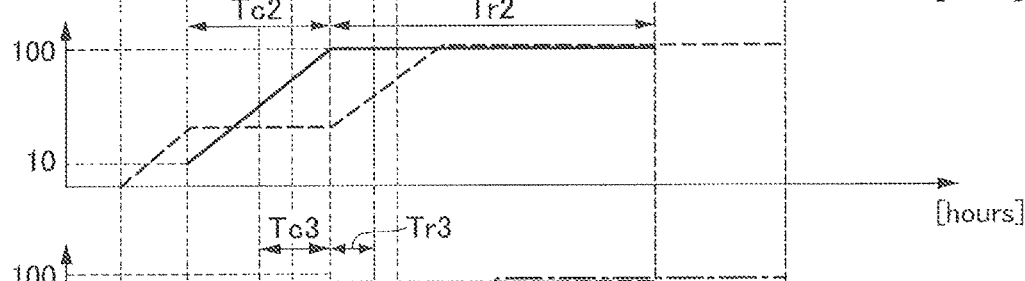
Figure 4C:
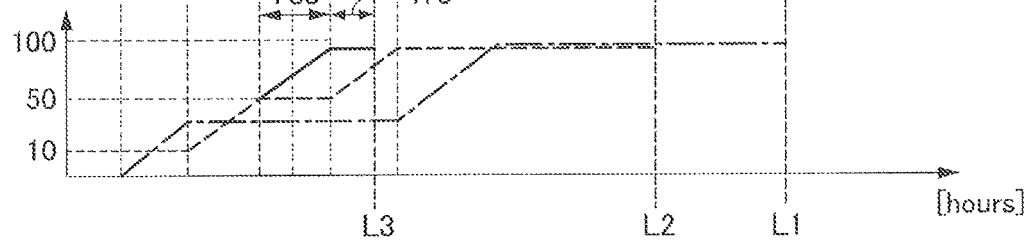

FIG. 4 are drawings showing charging control aspects when the charging control according to this embodiment is executed. In FIG. 4, horizontal axes indicate periods [hours] and vertical axes indicate SOC [%]. Dashed lines L1 to L3 vertically drawn indicate the respective planned departure times of the first to third vehicles. It should be noted that the horizontal axes, the vertical axes, and the dashed lines L1 to L3 are similar in FIG. 5 described below. In these FIG. 4, the target SOC of all the vehicles are 100%.

FIG. 4(A) shows the charging percentage (solid line) of the first vehicle when other vehicles do not interrupt. The planned departure time (L1) of the first vehicle is set late compared with other vehicles. It is seen that the rest period Tr1 of the first vehicle is large.

FIG. 4(B) shows the charging percentage (solid line) of the second vehicle that is permitted interrupt charging with respect to the first vehicle in charging and the charging percentage (dotted line) of the first vehicle that permits interrupt charging of the second vehicle. As can be seen from the drawing, the period Tc2 that takes for charging of the second vehicle is short with respect to the rest period Tr1 of the first vehicle, thus satisfying Tr1>Tc2. Accordingly, the second vehicle is permitted interrupt charging with respect to the first vehicle. As a result, the charging control is as shown in the drawing, even charging of the first vehicle is resumed after the completion of charging of the second vehicle, both the vehicles can complete charging before the planned departure times (L1 and L2) set by the respective vehicles.

FIG. 4 (C) shows the charging percentage (solid line) of the third vehicle that is permitted interrupt charging with respect to the second vehicle in charging, the charging percentage (dotted line) of the second vehicle that permits interrupt charging of the third vehicle to, and the charging percentage (dash-dotted line) of the first vehicle that permits interrupt charging of the second vehicle and the third vehicle. As can be seen from the drawings, since the SOC of the third vehicle at the start of charging is 50%, the period Tc3 that takes for charging is short. Accordingly, Tr1>Tc2+Tc3 is satisfied for the first vehicle, and Tr2>Tc3 is satisfied for the second vehicle. As a result, interrupt charging of the third vehicle with respect to the second vehicle in charging is permitted. Accordingly, the third vehicle starts interrupt charging and can complete charging before the planned departure time. Then, even charging of the second vehicle is resumed after charging of the third vehicle is finished, the second vehicle can finish charging before the planned departure time of its own vehicle. Furthermore, even charging of the first vehicle is resumed after charging of the second vehicle is finished, charging can be completed before the planned departure time of the first vehicle. Thus, executing the charging control according to this embodiment ensures all the first, second, and third vehicles completing charging before the planned departure times.

On the other hand, the charging aspect of when the charging control according to this embodiment is not executed will be described using FIG. 5. A solid line in FIG. 5 (A) shows the charging percentage of the first vehicle. It should be noted that in this FIG. 5, similarly to FIG. 4, the target SOC of all the vehicles are 100%.

Figure 5A:
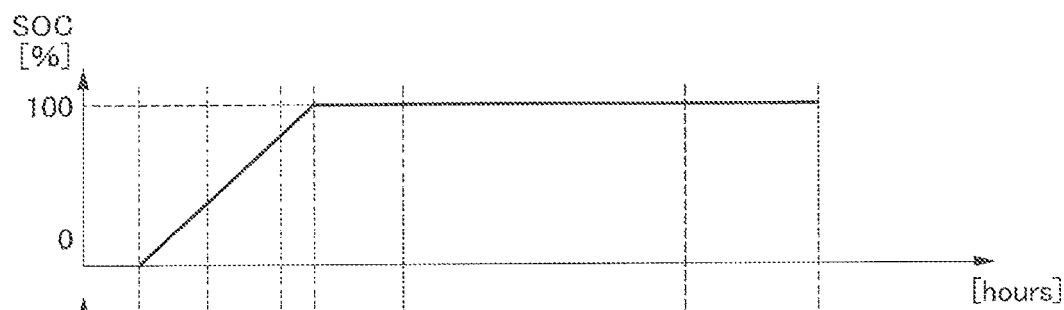
FIG. 5 are drawings to describe charging aspects when the charging control according to the present invention is not executed.
Figure 5B:
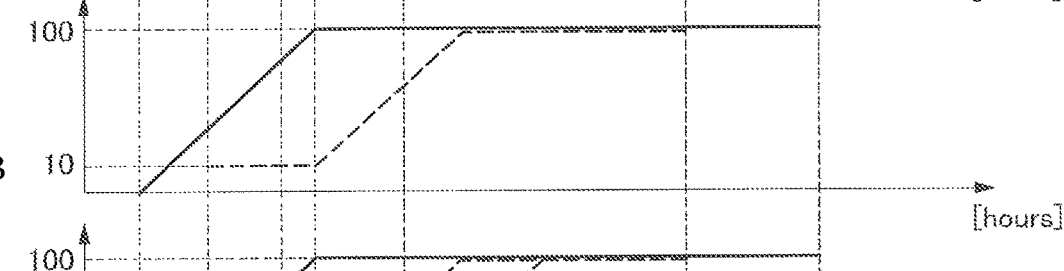

FIG. 5(B) shows the charging percentage (dotted line) of the second vehicle in addition to the charging percentage of the first vehicle. In this case, since charging is performed according to the first-come basis, the second vehicle starts charging after charging of the first vehicle is finished.

Figure 5C:
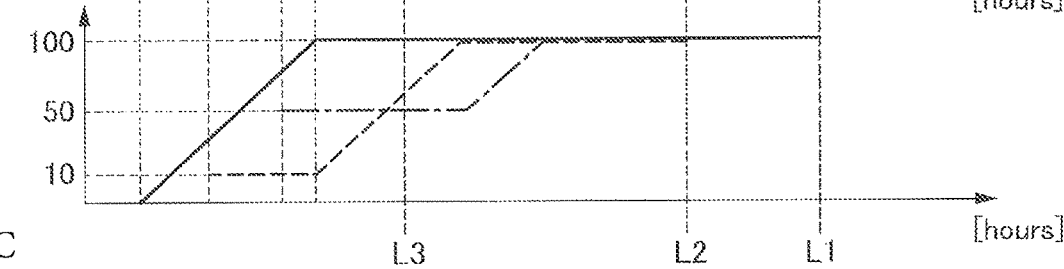

FIG. 5 (C) shows the charging percentage (dash-dotted line) of the third vehicle in addition to the first vehicle and the second vehicle. As can be seen from the drawing, the third vehicle arrived later cannot start charging until charging of the second vehicle is completed regardless of a situation where a charging finishing time of the second vehicle is earlier than the planned departure time of its own vehicle and there is a sufficient time to spare in the rest period of the second vehicle. Thus, in the charging aspect in which the charging control according to this embodiment is not executed, it is seen that not only the third vehicle failing to finish charging before the planned departure time, there possibly is a case where the third vehicle cannot even start charging.

The above-mentioned charging control unit 10 in the first embodiment includes the plurality of charging ports 2a to 2c and sequentially charges the electric vehicles coupled to the respective charging ports 2a to 2c. The charging control unit determines whether the electric vehicles are coupled to the respective charging ports or not. The charging control unit calculates the estimate value Tc and the estimate value Tr for every charging port that is determined to have the coupling of the electric vehicle. The estimate value Tc is the period that takes from the start of charging to the completion of charging of the electric vehicle coupled to the charging port. The estimate value Tr is the period from the completion of charging of the electric vehicle to the departure of the electric vehicle. The charging control unit, when the electric vehicle coupled to the charging ports 2a to 2c last is set to the N-th vehicle and the electric vehicles already coupled to the charging ports are set to the first to N−1-th vehicles in the order of being coupled to the charging ports, and only when the above-described Formula (4) is satisfied by all the first to N−1-th vehicles, starts charging of the N-th vehicle. The charging control unit controls to resume charging of the vehicle that was charging immediately before the N-th vehicle started charging as soon as charging of the N-th vehicle finishes. In view of this, the charging order of the plurality of the electric vehicles coupled to the charger 1 can be appropriately controlled. Therefore, both the earlier-arrived vehicles (the first to N−1-th vehicles) and the later-arrived vehicle (the N-th vehicle) that is permitted interrupt charging can charge up to the target battery charging capacity before the planned departure times desired by the respective vehicles.

The charging control unit 10 in the first embodiment detects the battery remaining capacity of the electric vehicle and the target battery charging capacity of the electric vehicle, and calculates the estimate value Tc on the basis of the difference between the battery remaining capacity of the electric vehicle and the target battery charging capacity of the electric vehicle. In view of this, the estimate value Tc of the period that takes for charging can be accurately calculated.

The charging control unit 10 in the first embodiment calculates the estimate value Tr by subtracting the estimate value Tc from the period until the planned departure time detected of the electric vehicle. In view of this, the estimate value Tr of the period from the completion of charging of the vehicle to the planned departure time of the vehicle can be accurately calculated.

Second Embodiment

Figure 6:
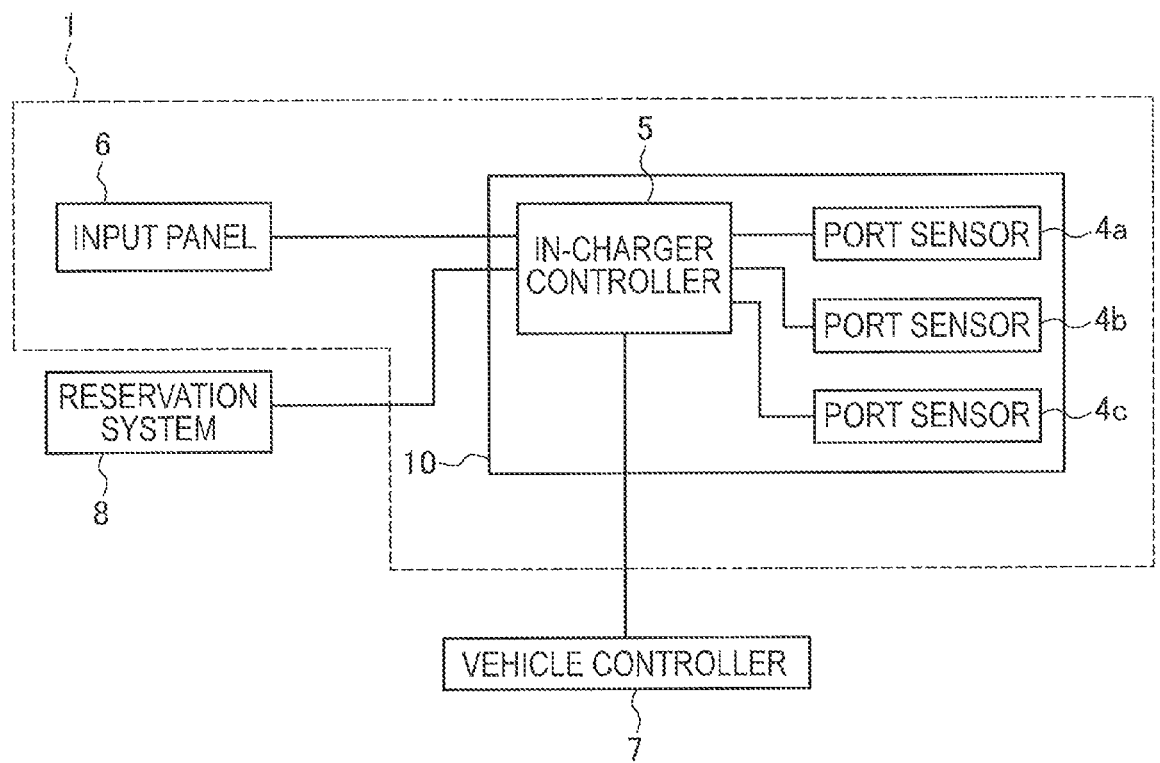
FIG. 6 is a block diagram illustrating main configuration of a charger 1 including a charging control unit in a second embodiment

FIG. 6 is a block diagram illustrating a main configuration of the charger 1 including the charging control unit 10 in a second embodiment. The charging control unit 10 of this embodiment is different in that a reservation system 8 is added compared with the first embodiment. In this embodiment, the planned departure time of the vehicle used for calculating the estimate value Tr at Step S4 in FIG. 3 is obtained by using this reservation system 8. The following specifically describes.

First, as an assumption, the passenger or the like of the electric vehicle can have the charger 1 reserved for charging via, for example, the internet before its own vehicle arrives the charging spot with the charger 1. The reservation system 8, by wired or wirelessly, obtains predetermined information input by the passenger when this charging reservation is made in the case where the charger 1 is reserved for charging and transmits the obtained information to the controller 5. The passenger also inputs the planned departure time from the charging spot with the reserved charger 1 in addition to, for example, a reservation time when the charging spot is reserved. In view of this, the controller 5 can obtain the planned departure time of this electric vehicle before the electric vehicle that made the charging reservation arrives the charging spot.

It should be noted that the passenger or the like may input the target battery charging capacity when the reservation for the charger 1 is made. In such case, the controller 5 can obtain the target battery charging capacity SOCt [%] used when the estimate value Tc is calculated at Step S3 in FIG. 3 before the electric vehicle arrives at the charging spot.

The reservation system 8 can obtain the planned departure time of the vehicle in cooperation with usage time management systems of various kinds of shops, such as facilities including an amusement park and a cinema, and restaurants, that own the charger 1. For example, in the case where a seat reservation is made for a certain movie in a cinema, the planned departure time of the vehicle is at least after a finishing time of this movie.

With the charging control unit for electric vehicle in the second embodiment described above, when the passenger or the like of the electric vehicle reserves the charging spot with the charger 1, the controller 5 can obtain the planned departure time from this charging spot via the reservation system 8. In view of this, the controller 5 can preliminarily obtain an accurate planned departure time desired by the passenger.

With the charging control unit for electric vehicle in the second embodiment, the controller 5 can, via the reservation system 8 in cooperation with the usage time management systems of facilities, shops, and the like that own the charger, obtain the planned departure time of a person who uses this facility, shop, and the like from this facility or the like. In view of this, the controller 5 can easily obtain the planned departure time of the vehicle without requiring an input operation by the passenger.

The embodiments of the present invention described above are merely illustration of some application examples of the present invention and not of the nature to limit the technical scope of the present invention to the specific constructions of the above embodiments.

The invention claimed is:

1. A charging control unit including a plurality of charging ports, the charging control unit controlling a charging order of electric vehicles coupled to the respective charging ports, the charging control unit comprising:
   a vehicle coupling determining unit configured to determine whether the electric vehicles are coupled to the respective charging ports or not;
   a calculator configured to calculate a respective estimate value Tc and a respective estimate value Tr for every charging port that is determined to have a coupling of the electric vehicle by the vehicle coupling determining unit,
      wherein the respective estimate value Tc being a period from a start of charging to a completion of charging of a respective electric vehicle coupled to the charging port, and
      wherein the respective estimate value Tr being a period from the completion of charging of the respective electric vehicle to a departure of the respective electric vehicle; and
   a control unit configured to:
      determine whether to stop charging of an electric vehicle currently being charged and to start interrupt charging for charging a last-connected electric vehicle to the charging port at least by comparing a sum of the respective estimate values Tc of the every charging port that is determined to have a coupling of the electric vehicle excluding the last-connected electric vehicle and an estimate value Tr of the last-connected electric vehicle; and
      control the charging order of the electric, wherein
         the control unit, when the electric vehicle coupled to the charging port last is set to an N-th vehicle and the electric vehicles already coupled to the charging ports are set to first to N−1-th vehicles in an order of being coupled to the charging ports and N is an integer of 3 or more, and only when Formula (1) is satisfied by all the first to N−1-th vehicles, starts interrupt charging of the N-th vehicle and controls to resume charging of the electric vehicle that was charging immediately before the N-th vehicle started charging as soon as charging of the N-th vehicle finishes:

$$Tr(n) > \Sigma_{n+1}^{N} Tc \quad (1)$$

wherein
      Tc: estimate value of period that takes for charging of electric vehicle,
      Tr: estimate value of period from completion of charging of electric vehicle to departure of this electric vehicle, and
      $1 \leq n \leq N-1$.

2. The charging control unit according to claim 1, comprising:
   a vehicle information detecting unit configured to detect a battery remaining capacity of the electric vehicle and a target battery charging capacity of the electric vehicle, wherein
   the calculator calculates the respective estimate value Tc on the basis of a difference between the battery remaining capacity of the electric vehicle detected by the vehicle information detecting unit and the target battery charging capacity of the electric vehicle.

3. The control unit for the electric vehicle according to claim 2, comprising:
   a planned departure time detecting unit configured to detect a planned departure time of the electric vehicle, wherein
   the calculator calculates the estimate value Tr by subtracting the estimate value Tc from a period from a charging start time to the vehicle planned departure time detected by the planned departure time detecting unit.

4. A charging control method using a plurality of charging ports, the charging control method controlling a charging order of electric vehicles coupled to the respective charging ports, the charging control method comprising:
   detecting whether the electric vehicles are coupled to the respective charging ports or not;
   calculating a respective estimate value Tc and a respective estimate value Tr for every charging port that is determined to have a coupling of the electric vehicle by a vehicle coupling determining unit,
      the respective estimate value Tc being a period for charging of the electric vehicle coupled to the charging port, and
      the respective estimate value Tr being a period from a completion of charging of the electric vehicle to a departure of the electric vehicle; and
   determining whether to stop charging of an electric vehicle currently being charged and to start interrupt charging for charging a last-connected electric vehicle to the charging port at least by comparing a sum of the respective estimate values Tc of the every charging port that is determined to have a coupling of the electric vehicle excluding the last-connected electric vehicle and an estimate value Tr of the last-connected electric vehicle,
      wherein, when a last electric vehicle coupled to the charging port last is set to an N-th vehicle and the electric vehicles already coupled to the charging ports are set to 1 to N−1-th vehicles in an order of being coupled to the charging ports and N is an integer of 3 or more, and only when Formula (2) is satisfied by all the 1 to N−1-th vehicles, performing steps comprising:
      stopping charging the electric vehicle that was charging immediately before the N-th vehicle;
      starting interrupt charging of the N-th vehicle; and
      controlling to resume charging of the electric vehicle that was charging immediately before the N-th vehicle started charging as soon as charging of the N-th vehicle finishes, wherein Formula (2) is:

$$Tr(n) > \Sigma_{n+1}^{N} Tc \quad (2)$$

wherein Tc: estimate value of period for charging of electric vehicle, Tr: estimate value of period from completion of charging of electric vehicle to departure of this electric vehicle, and $1 \leq n \leq N-1$.

* * * * *